(12) United States Patent
McLaughlin

(10) Patent No.: US 7,133,465 B2
(45) Date of Patent: Nov. 7, 2006

(54) MODIFIED TOMLINSON-HARASHIMA PRECODING METHOD CIRCUIT FOR INFINITE IMPULSE RESPONSE (IIR) CHANNELS

(75) Inventor: Michael Joseph McLaughlin, Dublin (IE)

(73) Assignee: Inter-Tel, Inc., Tempe, AZ (US)

( * ) Notice: Subject to any disclaimer, the term of this patent is extended or adjusted under 35 U.S.C. 154(b) by 904 days.

(21) Appl. No.: 10/168,630

(22) PCT Filed: Dec. 22, 2000

(86) PCT No.: PCT/IE00/00167

§ 371 (c)(1),
(2), (4) Date: Nov. 8, 2002

(87) PCT Pub. No.: WO01/48995

PCT Pub. Date: Jul. 5, 2001

(65) Prior Publication Data

US 2003/0123569 A1  Jul. 3, 2003

(30) Foreign Application Priority Data

Dec. 23, 1999 (IE) .................................. S991096

(51) Int. Cl.
*H04L 25/03* (2006.01)
*H03H 7/30* (2006.01)

(52) U.S. Cl. ...................... 375/296; 375/233
(58) Field of Classification Search .......... 375/219, 375/229, 232, 233, 257, 295, 296, 377, 285
See application file for complete search history.

(56) References Cited

U.S. PATENT DOCUMENTS

| | | | |
|---|---|---|---|
| 5,249,200 A | 9/1993 | Chen et al. | |
| 5,265,127 A | 11/1993 | Betts et al. | |
| 6,314,135 B1 * | 11/2001 | Schneider et al. | 375/232 |
| 6,324,220 B1 * | 11/2001 | Sellars | 375/296 |
| 6,650,698 B1 * | 11/2003 | Liau et al. | 375/229 |
| 2003/0035495 A1 * | 2/2003 | Laamanen et al. | 375/296 |
| 2003/0063680 A1 * | 4/2003 | Nedic et al. | 375/260 |

OTHER PUBLICATIONS

M. Sellers, et al. "Stabilized precoder with antenna diversity for wireless LANs" IEEE Transactions on Consumer Electronics, IEEE Inc., New York, US, vol. 45, No. 4, Nov. 1999, pp. 1169-1175, XP002137332.

(Continued)

*Primary Examiner*—Young T. Tse
(74) *Attorney, Agent, or Firm*—Michelle Whittington, Esq.

(57) ABSTRACT

A precoding circuit for minimizing distortion of an input signal in a communication channel having a compound transfer function in the Z-Domain: $H(z)=(1+a^1.z^{-1}+a_2.z^{-2}+a_3.z^{31\,3}+\ldots+a_n.z^{-n})/(1+b_1.z^-+b_2.z^{-2}+b_{-3}.z^{-3}+\ldots+b_p.z^{-p})$. A feedback circuit comprises a first FIR filter and a transfer function corresponding to the inverse of a feedforward part of a transfer function of the communication channel. A feedforward circuit comprises a second FIR filter and a transfer function corresponding to the inverse of a feedback part of a transfer function of the communication channel. A first subtracting circuit subtracts a feedback signal of the feedback circuit from a feedforward signal of the feedforward circuit and outputs a difference signal which is added to a transmit end signal by a first adding circuit. The difference signal is also added to the input signal by a second adding circuit, the output from the second adding circuit is fed to a quantizing circuit which outputs a value kM which is subtracted from the input signal by a second subtracting circuit.

21 Claims, 4 Drawing Sheets

OTHER PUBLICATIONS

G. D. Forney, Jr., et al. "Combined Equalization and Coding Using Precoding", IEEE Communication Magazine IEEE Service Center. Piscataway, N.J., US, vol. 29, No. 12, Dec. 1, 1991, pp. 25-34, XP000287979.

R Fischer et al.; "Signalformung Zur Begrenzung Der Dynamik Bei Der Tomlinson-Harashima-Vercodierung" Vortrage Der ITG-Fachtagung, Munchen, Oct. 26-28, 1994, Berlin, VDE Verlag, DE, vol. No. 130, 1994, pp. 457-466, XP000503821.

* cited by examiner

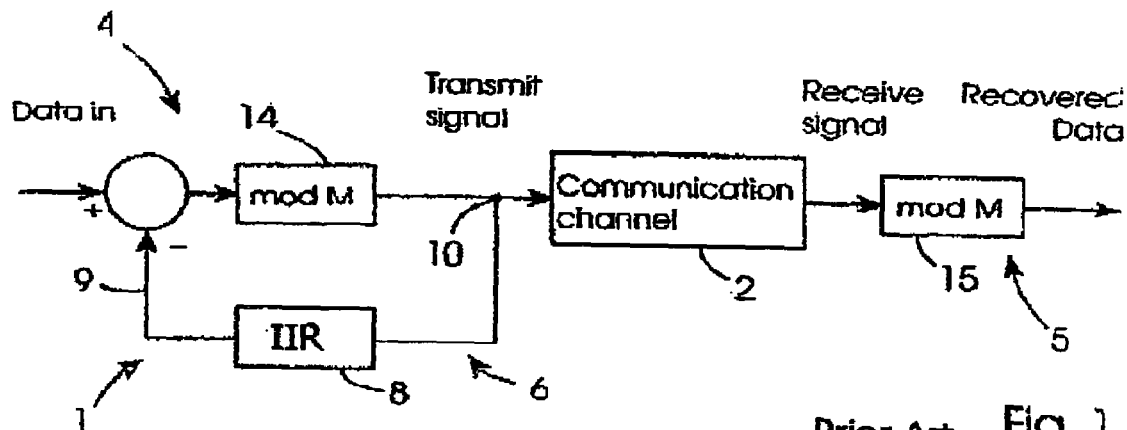
Prior Art - Fig. 1
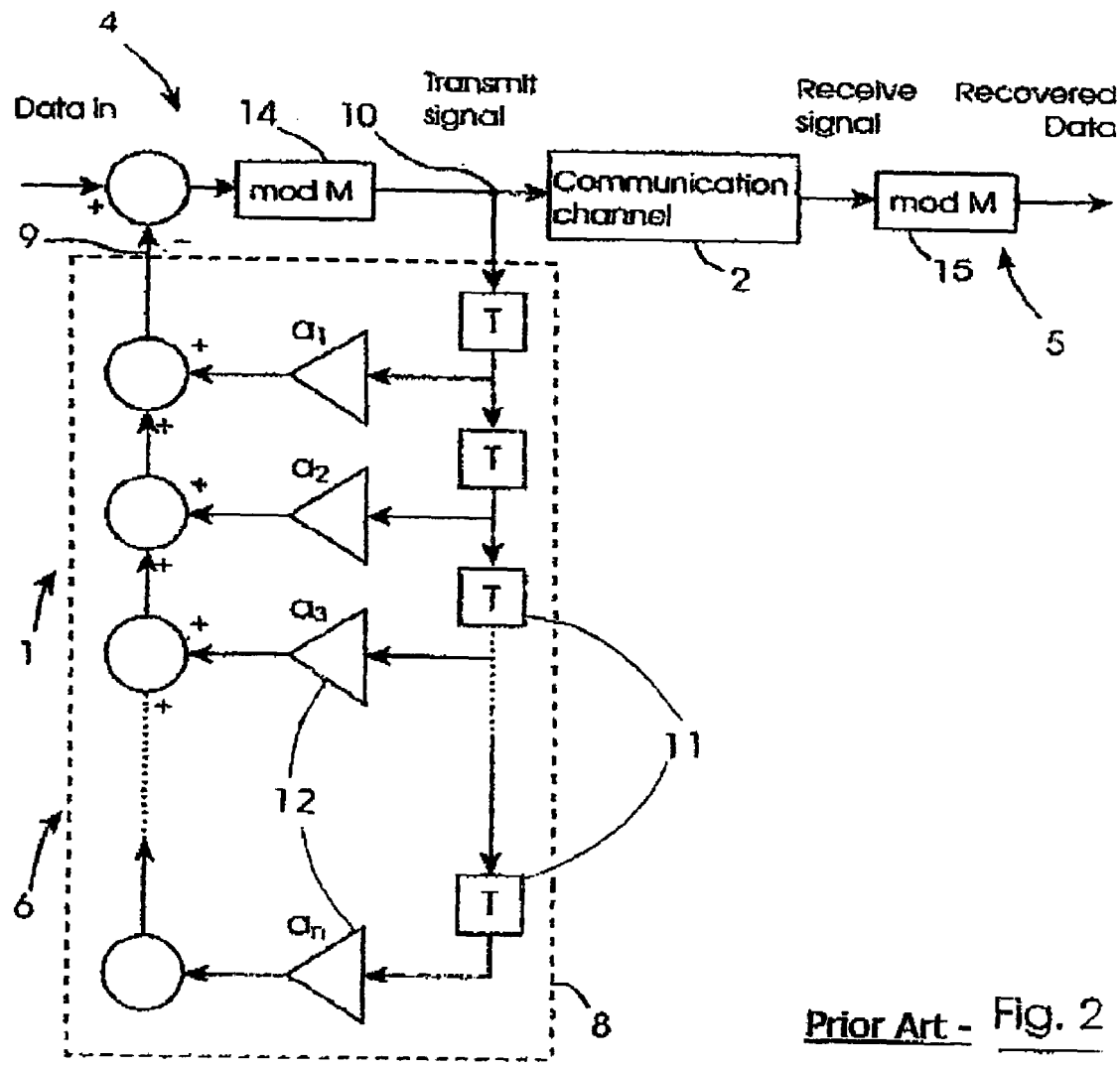
Prior Art - Fig. 2

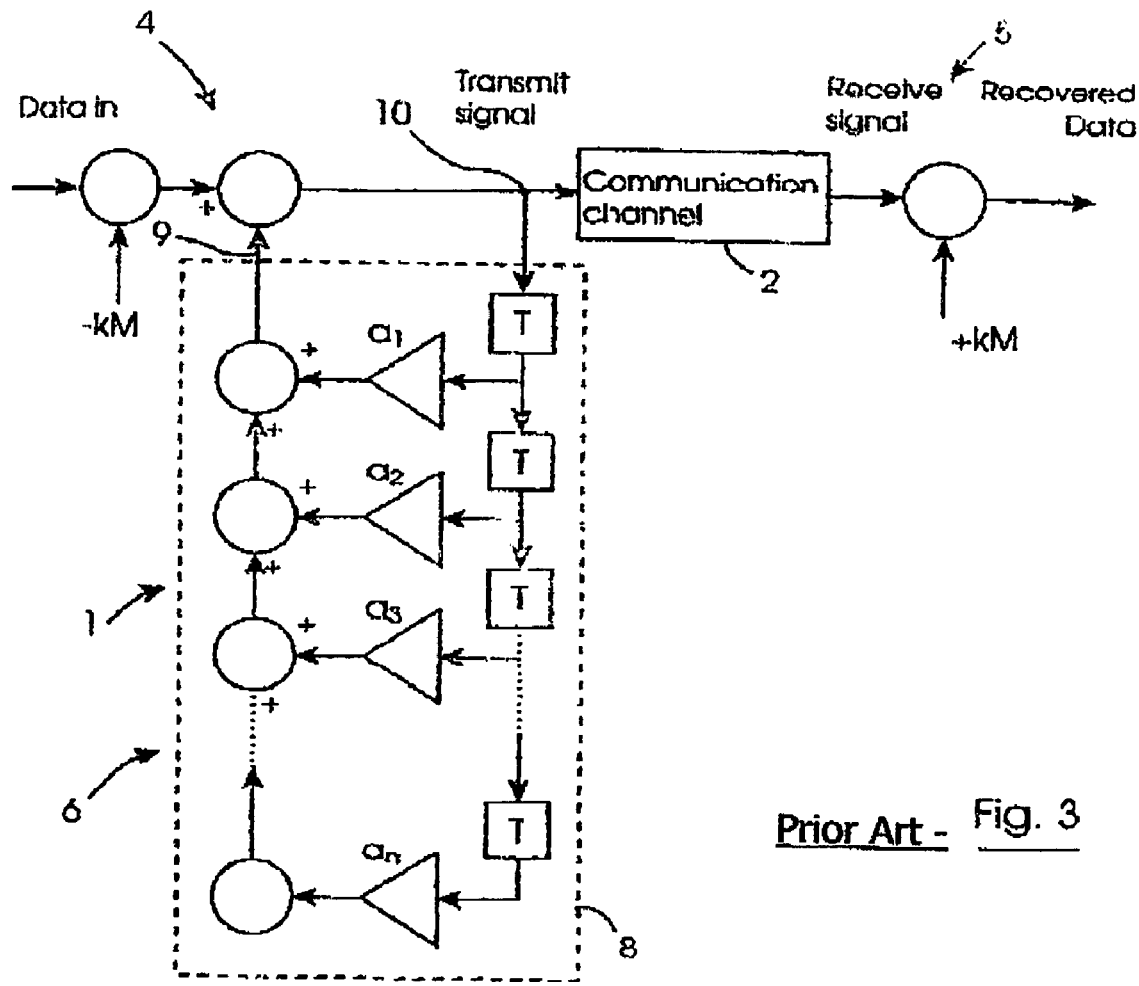
Prior Art - Fig. 3
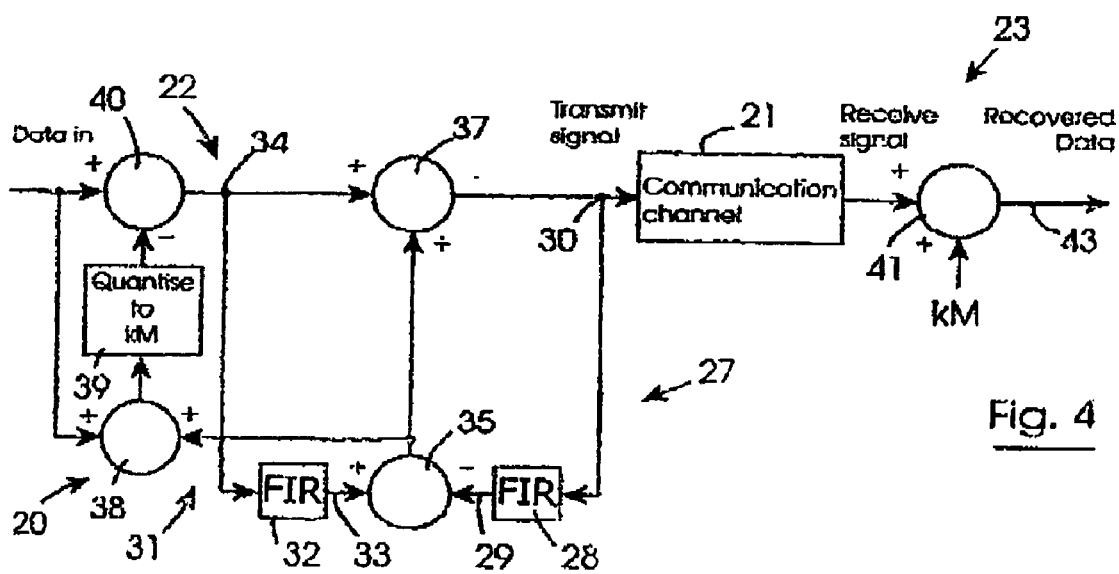
Fig. 4

MODIFIED TOMLINSON-HARASHIMA PRECODING METHOD CIRCUIT FOR INFINITE IMPULSE RESPONSE (IIR) CHANNELS

BACKGROUND OF THE INVENTION (1) Field of the Invention

The present invention relates to a method and to a precoding circuit for minimising distortion of a signal being transmitted through a communication channel whereby the distortion is due to the transfer function of the communication channel. In particular, the invention relates to a method and a precoding circuit for pre-equalising a subset of communication channels where the first coefficient of the feedforward part of the transfer function is equal to zero, although the invention is not so limited.

(2) Description of Related Art

It is known to provide a Tomlinson-Harashima precoding circuit and method for pre-equalisation of a communication channel whose impulse response is finite and known, in other words, for communication channels with a feedforward transfer function which can be expressed by the following equation in the Z-Domain:

$$H(z) = (1 + a_1 . z^{-1} + a_2 . z^{-2} + a_3 . z^{-3} + \ldots + a_n . z^{-n})$$

The Tomlinson-Harashima precoding method and circuit is disclosed in "New Automatic Equaliser Employing Modulo Arithmetic", *Electronic Letters*, Vol. 7, Nos. 5/6, Mar. 25, 1971, pp. 138–139 by Tomlinson, M and *Digital Communication*, $2^{nd}$ edition, by Edward A. Lee and David G. Messerschmidt, Kluwer Academic Publishers. FIG. 1 illustrates a block representation of such a precoding circuit according to Tomlinson-Harashima. An input data signal in the range $$+\frac{M}{2} \text{ to } -\frac{M}{2}$$

is applied to a communication channel at the transmit end and is received at the receive end. In the Tomlinson-Harashima precoding circuit a feedback circuit is provided at the transmit end of the communication channel, and the feedback circuit has the transfer function which is the inverse of the feedforward part of the transfer function of the communication channel. A feedback signal from the feedback circuit is subtracted from the signal at the transmit end of the communication channel. A modulo operator is provided in the communication channel between the input and the output of the feedback circuit whereby a function kM is subtracted from the signal at the transmit end of the communication channel. The term k is an integer which may be positive, negative or zero and is chosen so that the output of the modulo operator is in the range $$+\frac{M}{2} \text{ to } -\frac{M}{2}.$$

. A similar modulo operator is provided at the receive end of the communication channel through which the signal at the receive end is passed for facilitating the recovery of the input data at the receive end. However, the Tomlinson-Harashima precoding circuit and method while it is suitable for pre-equalisation of a communication channel, it is only suitable for dealing with the feedforward part of the transfer function of the communication channel.

There is therefore a need for a method and a precoding circuit for pre-equalisation of a communication channel for minimising distortion of an input signal being transmitted in the communication channel which takes account of both the feedforward and feedback parts of the transfer function of the communication channel.

BRIEF SUMMARY OF THE INVENTION

The present invention is directed towards providing such a method and a precoding circuit.

According to the invention there is provided a precoding circuit for connecting to a communication channel at a transmit end thereof for minimising distortion of an input signal of range $$+\frac{M}{2} \text{ to } -\frac{M}{2}$$

being transmitted through the communication channel between the transmit end and a receive end of the communication channel, whereby the distortion is due to the transfer function of the communication channel, the precoding circuit comprising:

a feedback circuit connected to the transmit end of the communication channel, and having a transfer function which is the inverse of the feedforward part of the transfer function of the communication channel, a feedforward circuit connected to the transmit end of the communication channel, and having a transfer function which is the inverse of the feedback part of the transfer function of the communication channel, a first circuit means for subtracting the feedback signal of the feedback circuit from the feedforward signal of the feedforward circuit, and for outputting a difference signal, which is the difference of the feedback and feedforward signals, a second circuit means for outputting a control signal of value kM derived from the difference signal and the input signal, where k is an integer and may be positive, negative or zero, and for selecting the value of k such that when the control signal is subtracted from the input signal at the transmit end the value of the signal being outputted from the precoding circuit to the communication channel is minimised, and a third circuit means for subtracting the control signal from the input signal upstream of the feedback and feedforward circuits.

In one embodiment of the invention the feedforward signal from the feedforward circuit is applied to the transmit end of the communication channel upstream of a node from which the feedback circuit derives its input from the transmit end of the communication channel.

In another embodiment of the invention the feedforward circuit is upstream of the feedback circuit.

Alternatively, the feedforward circuit is downstream of the feedback circuit, and a node from which the feedforward circuit derives its input from the transmit end of the communication channel is downstream of the feedback circuit.

In a further embodiment of the invention the first circuit means comprises a first subtracting means for subtracting the feedback signal from the feedforward signal and for outputting the difference signal.

In one embodiment of the invention a first adding means is provided for adding the difference signal from the first circuit means to the signal in the transmit end of the communication channel.

In another embodiment of the invention the value of k of the control signal is selected by the second circuit means such that when the control signal is subtracted from the input signal the value of the signal at the output from the precoding circuit as it is fed to the communication channel is within the range $$-\frac{M}{2} \text{ to } -\frac{M}{2}.$$

In a further embodiment of the invention the difference signal and the input signal are added to provide an intermediate signal, and the intermediate signal is fed to the second circuit means, and the control signal is derived by the second circuit means from the intermediate signal.

In a still further embodiment of the invention a second adding means is provided for adding the input signal and the difference signal from the first subtracting means for providing the intermediate signal.

In one embodiment of the invention the second circuit means comprises a quantising circuit for deriving the control signal from the intermediate signal.

In one embodiment of the invention the third circuit means comprises a second subtracting means for subtracting the control signal from the input signal.

Preferably, the difference signal from the first subtracting means is applied to the transmit end of the communication channel intermediate the respective nodes from which the feedback circuit and the feedforward circuit derive their respective inputs from the transmit end of the communication channel.

In one embodiment the feedback circuit is an infinite impulse response structure.

Preferably, the feedback circuit comprises a first finite impulse response filter.

In one embodiment of the invention the feedforward circuit is a finite impulse response structure.

Preferably, the feedforward circuit comprises a second finite impulse response filter.

Advantageously, the first coefficient of the second finite impulse response filter is one.

In one embodiment of the invention the impulse response of the communication channel is finite.

In one embodiment of the invention the feedforward part of the transfer function of the communication channel can be broadly expressed in the Z-Domain by the equation:

$$H(z) = (1 + a_1 \cdot z^{-1} + a_2 \cdot z^{-2} + a_3 \cdot z^{-3} + \ldots + a_n \cdot z^{-n})$$

In another embodiment of the invention the impulse response of the communication circuit is infinite.

In another embodiment of the invention the feedback part of the transfer function of the communication channel can be broadly expressed in the Z-Domain by the equation:

$$H(z) = \frac{1}{(1 + b_1 \cdot z^{-1} + b_2 \cdot z^{-2} + b_3 \cdot z^{-3} + \ldots + b_p \cdot z^{-p})}$$

In a further embodiment of the invention the compound transfer function of the communication channel can be broadly expressed in the Z-Domain by the equation:

$$H(z) = \frac{(1 + a_1 \cdot z^{-1} + a_2 \cdot z^{-2} + a_3 \cdot z^{-3} + \ldots + a_n \cdot z^{-n})}{(1 + b_1 \cdot z^{-1} + b_2 \cdot z^{-2} + b_3 \cdot z^{-3} + \ldots + b_p \cdot z^{-p})}$$

In one embodiment of the invention the transfer function of the feedback circuit can be broadly expressed in the Z-Domain by the equation:

$$H(z) = \frac{1}{(1 + a_1 \cdot z^{-1} + a_2 \cdot z^{-2} + a_3 \cdot z^{-3} + \ldots + a_n \cdot z^{-n})}$$

In one embodiment of the invention the transfer function of the feedforward circuit can be broadly expressed in the Z-Domain by the equation:

$$H(z) = (1 + b_1 \cdot z^{-1} + b_2 \cdot z^{-2} + b_3 \cdot z^{-3} + \ldots + b_p \cdot z^{-p})$$

In one embodiment of the invention the precoding circuit is adapted for use with a subset of communication channels where the feedforward part of the transfer function is minimum phase.

In one embodiment of the invention a gain circuit means is provided at the transmit end of the communication channel downstream of the precoding circuit for compensating for the first coefficient of the feedforward part of the transfer function of the communication channel.

In one embodiment of the invention the precoding circuit is for equalising a subset of communication channels where the first coefficient of the feedforward part of the transfer function is equal to one.

In another embodiment of the invention a third adding means is provided at the receive end of the communication channel for adding a value kM to the signal at the receive end of the communication channel for facilitating recovery of the input signal at the receive end, the value of kM corresponding to the value of kM subtracted from the signal at the transmit end of the communication channel.

In one embodiment of the invention the precoding circuit is adapted for use with a non-linear constellation, and a first converting means is provided for converting the signal at the transmit end of the communication channel from being linear to being non-linear. Preferably, the first converting means is located after the third circuit means. Advantageously, a second converting means is provided at the receive end of the communication channel for converting the received signal at the receive end from non-linear to linear.

Further, the invention provides a communication circuit comprising a precoding circuit according to the invention.

Additionally, the invention provides a method for minimising distortion of a signal of range $$+\frac{M}{2} \text{ to } -\frac{M}{2}$$

being transmitted through a communication channel between a transmit end and a receive end of the communication channel, whereby the distortion is due to the transfer function of the communication channel, the method comprising the steps of:

feeding back the signal at the transmit end of the communication channel through a feedback circuit having a transfer function which is the inverse of the feedforward part of the transfer function of the communication channel, feeding forward the signal at the transmit end of the communication channel through a feedforward circuit having a transfer function which is the inverse of the feedback part of the transfer function of the communication channel, subtracting the feedback signal of the feedback circuit from the feedforward signal of the feedforward circuit to provide a difference signal, deriving a control signal of value kM from the difference signal and the input signal, where k is an integer and may be positive, negative or zero, the value of k being selected such that when the control signal of value kM is subtracted from the input signal at the transmit end, the value of the signal being outputted from the precoding circuit to the communication channel is minimised, and subtracting the control signal of value kM from the input signal upstream of the feedback and feedforward circuits.

In one embodiment of the invention the feedforward signal from the feedforward circuit is applied to the transmit end of the communication channel upstream of a node from which the feedback circuit derives its input from the transmit end of the communication channel.

In another embodiment of the invention the feedforward circuit is upstream of the feedback circuit.

In a further embodiment of the invention the feedback and feedforward signals are applied to the transmit end of the communication channel intermediate respective nodes from which the feedback circuit and the feedforward circuit derive their respective inputs at the transmit end of the communication channel.

Alternatively, the feedforward circuit is downstream of the feedback circuit, and a node from which the feedforward circuit derives its input from the transmit end of the communication channel is downstream of the feedback circuit.

In one embodiment of the invention the value of k of the control signal is selected such that when the control signal is subtracted from the input signal at the transmit end of the communication channel, the value of the signal being outputted from the precoding circuit to the communication channel at the transmit end thereof is within the range $$+\frac{M}{2} \text{ to } -\frac{M}{2}.$$

In another embodiment of the invention the difference signal and the input signal are added to provide an intermediate signal, and the control signal of value kM is derived from the intermediate signal.

In one embodiment of the invention the impulse response of the communication channel is finite.

In another embodiment of the invention the feedforward part of the transfer function of the communication channel can be broadly expressed in the Z-Domain by the equation:

$$H(z) = (1 + a_1 \cdot z^{-1} + a_2 \cdot z^{-2} + a_3 \cdot z^{-3} + \ldots + a_n \cdot z^{-n})$$

In a further embodiment of the invention the feedback part of the transfer function of the communication channel can be broadly expressed in the Z-Domain by the equation:

$$H(z) = \frac{1}{(1 + b_1 \cdot z^{-1} + b_2 \cdot z^{-2} + b_3 \cdot z^{-3} + \ldots + b_p \cdot z^{-p})}$$

In a still further embodiment of the invention the compound transfer function of the communication channel can be broadly expressed in the Z-Domain by the equation:

$$H(z) = \frac{(1 + a_1 \cdot z^{-1} + a_2 \cdot z^{-2} + a_3 \cdot z^{-3} + \ldots + a_n \cdot z^{-n})}{(1 + b_1 \cdot z^{-1} + b_2 \cdot z^{-2} + b_3 \cdot z^{-3} + \ldots + b_p \cdot z^{-p})}$$

In one embodiment of the invention the transfer function of the feedback circuit can be broadly expressed in the Z-Domain by the equation:

$$H(z) = \frac{1}{(1 + a_1 \cdot z^{-1} + a_2 \cdot z^{-2} + a_3 \cdot z^{-3} + \ldots + a_n \cdot z^{-n})}$$

In another embodiment of the invention the transfer function of the feedforward circuit can be broadly expressed in the Z-Domain by the equation:

$$H(z) = (1 + b_1 \cdot z^{-1} + b_2 \cdot z^{-2} + b_3 \cdot z^{-3} + \ldots + b_p \cdot z^{-p})$$

In one embodiment of the invention the method is adapted for use with a subset of communication channels where the feedforward part of the transfer function is minimum phase.

In another embodiment of the invention the signal being fed to the communication channel at the transmit end thereof is multiplied by a gain factor for compensating for the first coefficient of the feedforward part of the transfer function of the communication channel.

In one embodiment of the invention the method is for equalising a subset of communication channels where the first coefficient of the feedforward part of the transfer function is equal to one.

In another embodiment of the invention the method further comprises the step of adding a value of kM to the signal at the receive end of the communication channel for recovering the input signal at the receive end, the value of -kM corresponding to the value of kM subtracted from the signal at the transmit end of the communication channel.

In one embodiment of the invention the method is adapted for use with a non-linear constellation, and the signal at the transmit end of the communication channel is converted from being linear to being non-linear. Preferably, the signal at the transmit end of the communication channel is converted from being linear to being non-linear immediately after the control signal has been subtracted from the input signal.

BRIEF DESCRIPTION OF THE DRAWINGS

The invention will be more clearly understood from the following description of some preferred embodiments thereof, which are given by way of example only, with reference to the accompanying drawings in which:

FIG. 1 is a block representation of a Tomlinson-Harashima precoding circuit according to the prior art for pre-equalisation of a communication channel, FIG. 2 is a more detailed circuit diagram of the Tomlinson-Harashima prior art precoding circuit of FIG. 1, FIG. 3 is an alternative circuit diagram of the Tomlinson-Harashima prior art precoding circuit of FIG. 1, FIG. 4 is a block representation of a precoding circuit according to the invention for minimising distortion of an input signal being transmitted in a communication channel between a transmit end and a receive end, FIG. 8 is a block representation of a precoding circuit according to a still further embodiment of the invention for minimising distortion in an input signal being transmitted in a communication channel between a transmit end and a receive end.

DETAILED DESCRIPTION

Figure 5:
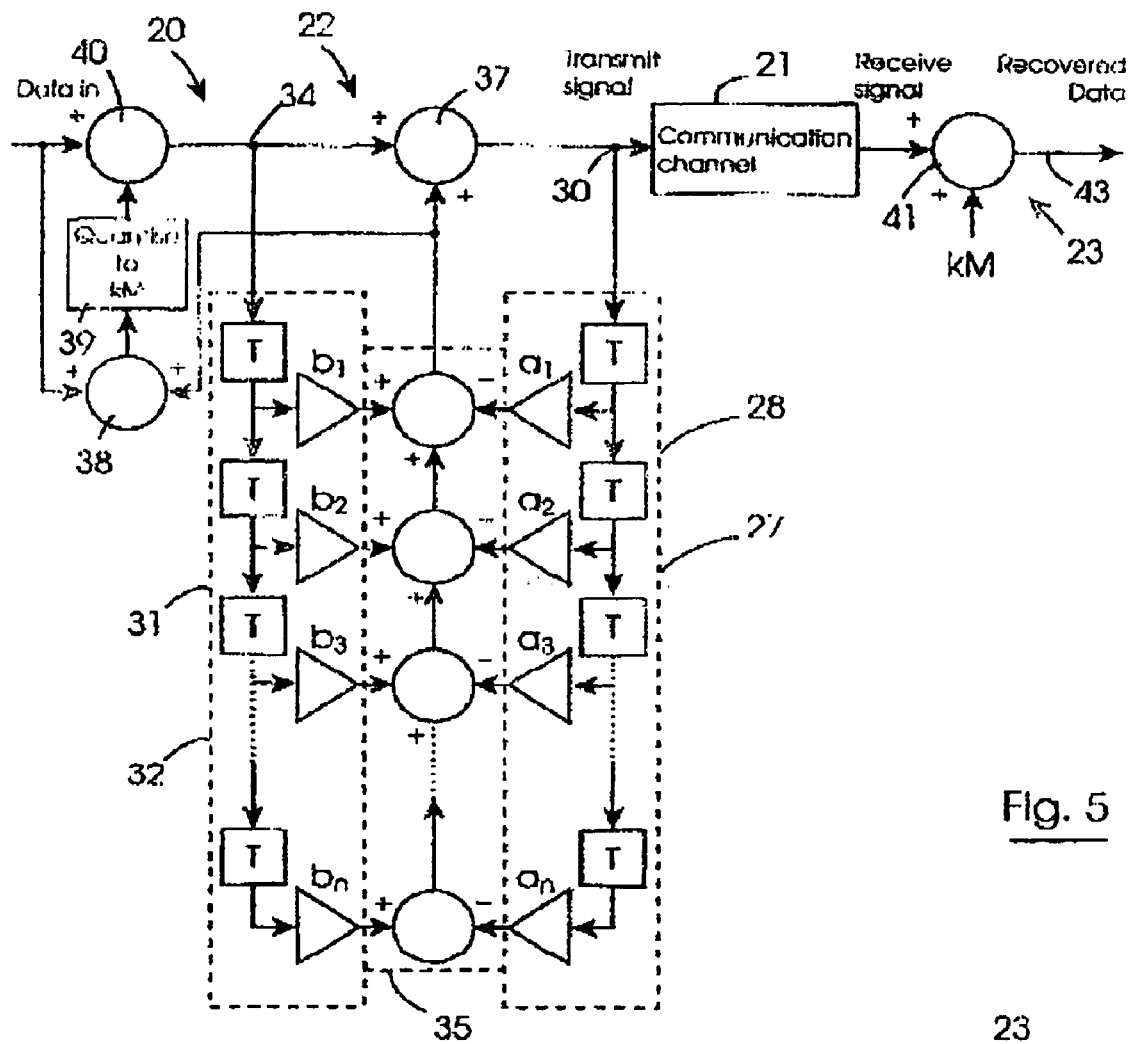
FIG. 5 is a more detailed circuit diagram of the precoding circuit of FIG. 4.

Referring to the drawings and initially to FIGS. 1 and 2, as discussed above, a Tomlinson-Harashima precoding circuit according to the prior art is illustrated and indicated generally by the reference numeral 1 for minimising distortion of a signal through a communication channel 2. The communication channel 2 has a finite impulse response which is known and a feedforward part of its transfer function which can be broadly expressed by the following equation in the Z-Domain:

$$H(z) = (1 + a_1 \cdot z^{-1} + a_2 \cdot z^{-2} + a_3 \cdot z^{-3} + \ldots + a_n \cdot z^{-n})$$

An input data signal having a data range of $$+\frac{M}{2} \text{ to } -\frac{M}{2}$$

to be transmitted through the communication channel 2 is inputted at a transmit end 4 of the communication channel 2. The input data is recovered from the communication channel 2 at a receive end 5 of the communication channel 2. The Tomlinson-Harashima precoding circuit 1 is provided at the transmit end 4 and comprises a feedback circuit 6 which has an infinite impulse response which is the inverse of the feedforward part of the transfer function of the communication channel 2. The input to the feedback circuit 6 is derived from a node 10 at the transmit end 4 of the communication channel 2. The feedback circuit 6 comprises an infinite impulse response filter 8 which comprises a plurality of one sample delay elements 11 and coefficient multipliers 12. This provides the feedback circuit 6 with a transfer function which can be broadly represented in the Z-Domain by the equation:

$$H(z) = \frac{1}{(1 + a_1 \cdot z^{-1} + a_2 \cdot z^{-2} + a_3 \cdot z^{-3} + \ldots + a_n \cdot z^{-n})}$$

The feedback signal on an output line 9 from the feedback circuit 6 is subtracted from the data input signal at the transmit end 4, and the difference of the input data signal and the feedback signal is applied to a modulo operator 14. The modulo operator 14 subtracts a value kM from the input to the modulo operator 14, where k is an integer which may be either positive, negative or zero. The integer k is selected so that the output from the modulo operator 14 is within the range $$+\frac{M}{2} \text{ to } -\frac{M}{2}.$$

. Thus, the output of the modulo M operator which is fed at the transmit end 4 into the communication channel 2 is the pre-equalised version of the input data signal. Since the transfer function of the feedback circuit 6 is the inverse of the feedforward transfer function of the communication channel, by passing the signal at the receive end 5 of the communication channel 2 through an equivalent modulo operator 15 at the receive end 5 and repeating the modulo operation on the received signal at the receive end 5, the original input data signal is recovered from the modulo M operator 15 at the receive end 5. The construction and operation of the Tomlinson-Harashima precoding circuit of FIGS. 1 and 2 will be well known to those skilled in the art.

FIG. 3 illustrates an equivalent precoding circuit to the Tomlinson-Harashima circuit of FIGS. 1 and 2, and similar components are identified by the same reference numerals. In this circuit, the function kM where k is any integer, positive, negative or zero is subtracted from the input data signal at the transmit end 4 upstream of the feedback circuit 6. The value of k is again selected so that the transmit signal being transmitted at the node 10 at the transmit end 4 of the communication channel 2 is within the range $$+\frac{M}{2} \text{ to } -\frac{M}{2}.$$

. In order to recover the input data signal at the receive end 5, a corresponding value kM is added to the received signal at the receive end 5 of the communication channel 2 and the input data signal is recovered. Thus, it will be apparent to those skilled in the art that the precoding circuit of FIG. 3 is equivalent to the Tomlinson-Harashima precoding circuit of FIGS. 1 and 2.

However, in all cases the prior art precoders are suitable only for dealing with the feedforward part of the transfer function of the communication channel. They do not deal with the feedback part of the transfer function of the communication channel.

Referring now to FIGS. 4 and 5, a precoding circuit according to the invention, which is indicated generally by the reference numeral 20, for minimising distortion of an input data signal in a telecommunication communication channel 21, between a transmit end 22 and a receive end 23 resulting from both the feedforward and feedback parts of the transfer function of the communication channel 21 will now be described. The precoding circuit 20 is ideally suited for pre-equalising a subset of communication channels where the first coefficient of the feedforward transfer function is one. The communication channel 21 has an impulse response which is infinite and known, and a feedforward part of its transfer function which can be broadly represented in the Z-Domain by the following equation:

$$H(z)=(1+a_1 \cdot z^{-1}+a_2 \cdot z^{-2}+a_3 \cdot z^{-3}+ \ldots +a_n \cdot z^{-n})$$

and a feedback part of its transfer function which can be broadly represented in the Z-Domain by the following equation:

$$H(z) = \frac{1}{(1 + b_1 \cdot z^{-1} + b_2 \cdot z^{-2} + b_3 \cdot z^{-3} + \ldots + b_p \cdot z^{-p})}$$

Accordingly, the compound transfer function of the communication channel 21 can be broadly represented in the Z-Domain by the following equation:

$$H(z) = \frac{(1 + a_1 \cdot z^{-1} + a_2 \cdot z^{-2} + a_3 \cdot z^{-3} + \ldots + a_n \cdot z^{-n})}{(1 + b_1 \cdot z^{-1} + b_2 \cdot z^{-2} + b_3 \cdot z^{-3} + \ldots + b_p \cdot z^{-p})}$$

The circuit 20 comprises a feedback circuit 27 which is connected at the transmit end 22 of the communication channel 21. The feedback circuit 27 is an infinite impulse response structure, and comprises a first finite impulse filter 28, which provides the feedback circuit 27 with a transfer function which is the inverse of the feedforward part of the transfer function of the communication channel 21. A feedback signal from the feedback circuit 27 is provided on an output line 29 from the first filter 28. The input to the feedback circuit is derived from a node 30 at the transmit end 22 of the communication channel 21.

A feedforward circuit 31 is connected at the transmit end 22 to the communication channel 21 upstream of the feedback circuit 27. The feedforward circuit 31 is a finite response structure, and comprises a second finite impulse response filter 32, the transfer function of which is the inverse of the feedback part of the transfer function of the communication channel 21. A feedforward signal from the feedforward circuit 31 is provided on an output line 33 from the second filter 32. The input to the feedforward circuit 31 is derived from a node 34 at the transmit end 22 of the communication channel 21.

The first filter 28 comprises a plurality of one sample delay elements and coefficient multipliers, and thus provide the feedback circuit 27 with a transfer function which is the inverse of the feedforward part of the transfer function of the communication channel 21. Thus, the transfer function of the feedback circuit 27 can be broadly represented in the Z-Domain by the equation:

$$H(z) = \frac{1}{(1 + a_1 \cdot z^{-1} + a_2 \cdot z^{-2} + a_3 \cdot z^{-3} + \ldots + a_n \cdot z^{-n})}$$

The second filter 32 comprises a plurality of one sample delay elements and coefficient multipliers, and thus provides the feedforward circuit 31 with a transfer function which is the inverse of the feedback part of the transfer function of the communication channel 21, and can be represented in the Z-Domain by the equation:

$$H(z)=(1+b_1 \cdot z^{-1}+b_2 \cdot z^{-2}+b_3 \cdot z^{-3}+ \ldots +b_p \cdot z^{-p})$$

A first circuit means comprising a first subtracting means, namely, a first subtracting circuit 35, subtracts the feedback signal on the output line 29 of the feedback circuit 27 from the feedforward signal on the output line 33 of the feedforward circuit 31, and a difference signal from the first subtracting circuit 35 is fed to a first adding means, namely, a first adding circuit 37. The first adding circuit 37 is provided in the transmit end of the communication channel 21, and adds the difference signal from the first subtracting circuit 35 to the transmit signal in the transmit end 22 of the communication channel 21.

A second adding means, namely, a second adding circuit 38 adds the input data signal with the difference signal from the first subtracting circuit 35, and outputs an intermediate signal which is the sum of the input data signal and the difference signal to a second circuit means which comprises a quantising circuit 39. The quantising circuit 39 outputs a control signal of value kM which is derived from the intermediate signal. The control signal is subtracted from the data input signal by a third circuit means, namely, a second subtracting circuit 40. The term k selected by the quantising circuit 39 is an integer, which may be positive, negative or zero, but is selected to be of sign and value such that the transmit signal at the node 30 at the output end of the precoding circuit 20 is within the range $$+\frac{M}{2} \text{ to } -\frac{M}{2}.$$

A third adding means, namely, a third adding circuit 41, is provided at the receive end 23 of the communication channel 21 for adding a corresponding value of kM to the receive signal at the receive end 23 of the communication channel 21 so that the recovered signal appearing on an output 43 of the third adding circuit 41 corresponds with the input data signal which is applied at the transmit end 22. Accordingly, since the feedback and feedforward circuits 27 and 31, respectively, have respective transfer functions which are the inverse of the feedforward and feedback parts of the transfer function, respectively, of the communication channel 21, the respective feedforward and feedback parts of the transfer function of the communication channel 21 are compensated for in the transmit signal at the output of the precoding circuit 20, in other words at the node 30 to be transmitted through the communication channel 21. By use of the quantising circuit 39 for outputting the control signal of value kM and for selecting k so that the value of kM is such that the transmit signal at the node 30 at the transmit end 22 of the communication channel 21 is always within the range +M/2 to −M/2 there is no danger of the combined feedback and feedforward circuits going into an infinite loop. By summing a value equivalent to the value of kM to the receive signal at the receive end 23 of the communication channel 21, the subtraction of the control signal of value kM from the input signal at the transmit end 22 of the communication channel 21 is compensated for, and accordingly, the signal appearing at the output terminal 43 at the receive end 23 corresponds with the input data signal inputted to the communication channel 21 at the transmit end 22.

Figure 6:
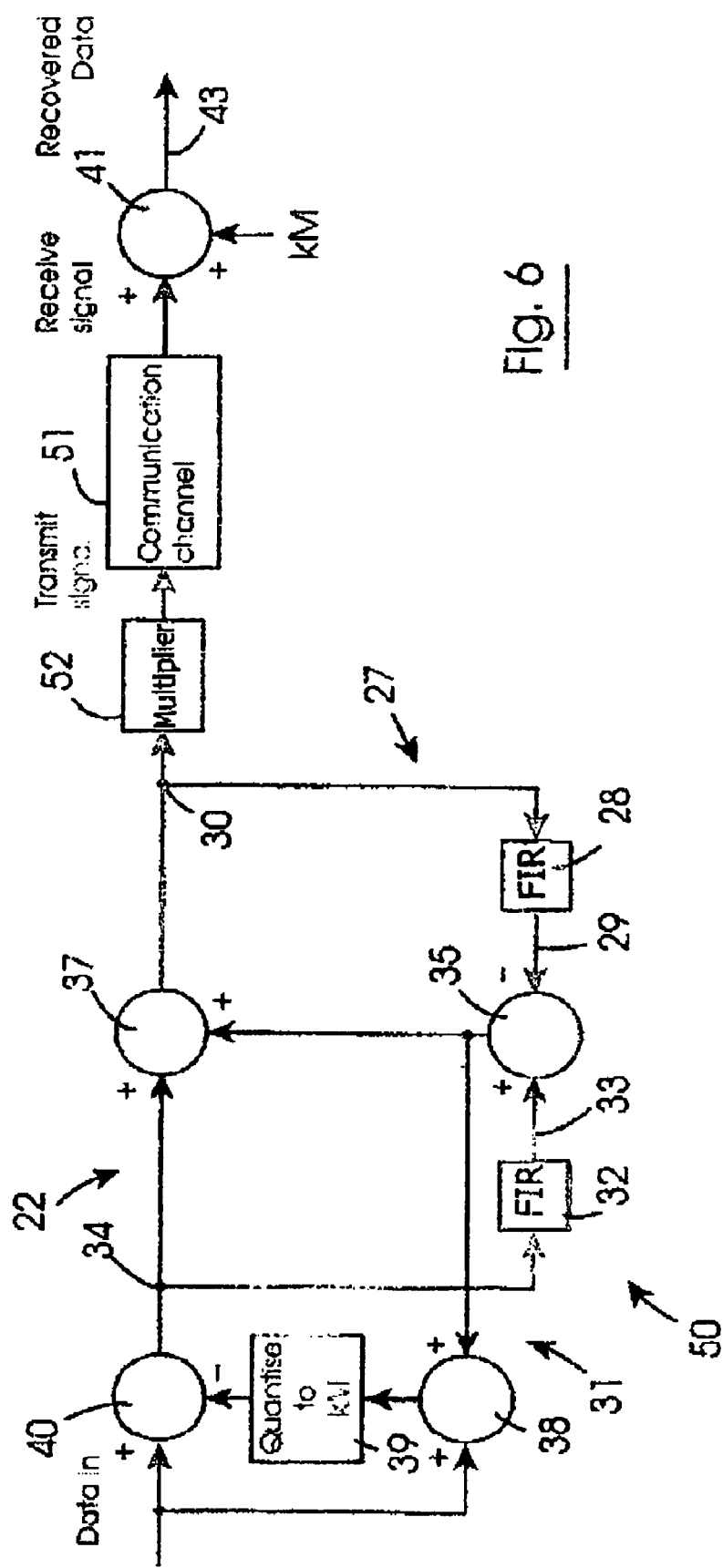
FIG. 6 is a block representation of a precoding circuit according to another embodiment of the invention for minimising distortion in an input signal being transmitted in a communication channel between a transmit end and a receive end.

Referring now to FIG. 6, a precoding circuit 50 also according to the invention for minimising distortion of an input data signal being transmitted through a communication channel 51 as a result of the feedforward and feedback part of the transfer function of the communication channel 51 is illustrated. The precoding circuit 50 is substantially similar to the precoding circuit 20 and similar components are identified by the same reference numerals. The main difference between the precoding circuit 50 and the precoding circuit 20 is that a gain means provided by a multiplying circuit 52 is provided between the precoding circuit 50 and the communication channel 51 for compensating for the first coefficient of the feedforward part of the transfer function of the communication channel 51. In this embodiment of the invention the compound transfer function of the communication channel 51 in the Z-Domain can be broadly represented by the following equation:

$$H(z) = \frac{A(z)}{B(z)} = \frac{g \cdot (1 + a_1 \cdot z^{-1} + a_2 \cdot z^{-2} + a_3 \cdot z^{-3} + \ldots + a_n \cdot z^{-n})}{(1 + b_1 \cdot z^{-1} + b_2 \cdot z^{-2} + b_3 \cdot z^{-3} + \ldots + b_p \cdot z^{-p})}$$

where g is the gain.

It is desirable that the transfer function A(z) of the compound transfer function is derived in the preceding circuit 50 by a minimum phase filter, and this is achieved by transforming the feedforward circuit 31 into its equivalent amplitude response minimum phase equivalent. However, this gives an incorrect phase response, and thus, an all-pass phase corrector (not shown) is required after the node 30. The multiplying circuit 52 multiplies the signal downstream of the node 30 by an appropriate gain factor g. The product signal from the multiplying circuit 52 is then transmitted through the communication channel 51.

Figure 7:
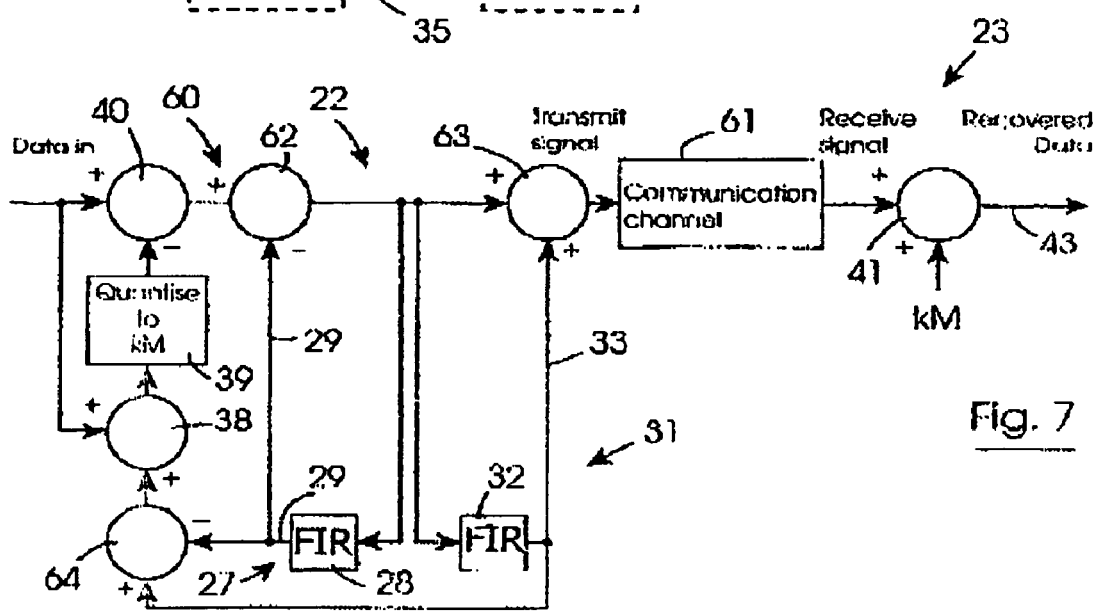
FIG. 7 is a block representation of a precoding circuit according to a further embodiment of the invention for minimising distortion in an input signal being transmitted in a communication channel between a transmit end and a receive end.

Referring now to FIG. 7, there is illustrated another preceding circuit also according to the invention, indicated generally by the reference numeral 60, for minimizing distortion of an input signal in a communication channel 61 which is similar to the communication channel 21. The precoding circuit 60 is somewhat similar to the preceding circuit 20 and similar components are identified by the same reference numerals. In this embodiment of the invention the feedback circuit 27 is provided upstream of the feedforward circuit 31. A subtracting circuit 62 subtracts the feedback signal on the output line 29 of the feedback circuit 27 from the signal in the transmit end 22 of the communication channel 61. An adding circuit 63 downstream of the subtracting circuit 62 adds the feedforward signal on the output line 33 of feedforward circuit 31 to the signal in the transmit end 22 of the communication channel 61. The first subtracting circuit 64 subtracts the feedback signal on the output line 29 from the feedforward signal on the output line 33 from the respective feedback circuit 27 and the feedforward circuit 31, respectively, and the difference signal from the first subtracting circuit 64 is added to the input data signal in the second adding circuit 38. Otherwise, the precoding circuit 60 is similar to the precoding circuit 20 and its operation is likewise similar. However, in certain instances, additional circuitry (not shown) may be required in order to prevent the output from the precoding circuit 60 which is fed to the communication circuit 61 going to infinity.

Referring now to FIG. 8, there is illustrated a precoding circuit according to a further embodiment of the invention which is indicated generally by the reference numeral 70. The precoding circuit in this embodiment of the invention is suitable for use with non-linear constellations. The precoding circuit 70 is substantially similar to the precoding circuit 20 described with reference to FIGS. 4 and 5, and similar components are identified by the same reference numerals. The main difference between the precoding circuit 70 and the precoding circuit 20 is that a first converting means comprising a first conversion circuit 72 is provided immediately after the second subtracting circuit 40. The first conversion circuit 72 includes a look-up table for converting linear constellation points to non-linear constellation points. The conversion is carried out by indexing into a non-linear constellation table. A second converting means comprising a second conversion circuit 73 is provided at the receive end 23 of the communication channel 71, which comprises a reverse look-up table which corresponds to the look-up table of the first conversion circuit 72 for reconverting the non-linear constellation points to linear constellation points. The signals from the second conversion circuit 73 are then fed to the third adding circuit 41 where the input data signal is recovered and outputted on the output 43.

Additionally, in this embodiment of the invention the difference signal from the first subtracting circuit 35 is not added to the input data signal, but rather, the difference signal from the first subtracting circuit 35 and the input data signal are fed directly to a selecting circuit which outputs a control signal of value kM which is selected in response to the values of the input data signal and the difference signal, and which in turn is fed to the second subtracting circuit 40 and subtracted from the input data signal. In this embodiment of the invention the value of k is chosen for minimising the absolute value of the transmit signal appearing at the node 30, rather than in the case of the precoding circuit 20 where the value of k is selected for maintaining the transmit signal at the node 30 within the range $$+\frac{M}{2} \text{ to } -\frac{M}{2}.$$

While a multiplying circuit has only been described with reference to the precoding circuit 50, it is envisaged that each of the precoding circuits described with reference to FIGS. 4 to 8 will in fact be provided with a multiplying circuit. It is also envisaged that an all-pass phase corrector which has been referred to as being provided with the precoding circuit 50 of FIG. 6 will be provided in each of the other precoding circuits of FIGS. 4 and 5, and FIGS. 7 and 8.

The invention claimed is:

1. A precoding circuit for connecting to a communication channel (21, 51, 61, 71) at a transmit end (22) thereof for minimising distortion of an input signal of range +M/2 to −M/2 being transmitted through the communication channel (21, 51, 61, 71) between the transmit end (22) and a receive end (23) of the communication channel (21, 51, 61, 71), whereby the distortion is due to a transfer function of the communication channel (21, 51, 61, 71), the precoding circuit (20, 50, 60, 70) comprising:

a feedback circuit (27) connected to the transmit end of the communication channel (21, 51, 61, 71), and having a transfer function which is the inverse of a feedforward part of the transfer function of the communication channel, a feedforward circuit (31) connected to the transmit end of the communication channel (21, 51, 61, 71), and having a transfer function which is the inverse of a feedback part of the transfer function of the communication channel (21, 51, 61, 71,), a first circuit means (35) for subtracting a feedback signal of the feedback circuit (27) from a feedforward signal of the feedforward circuit (31), and for outputting a difference signal, which is the difference of the feedback and feedforward signals, a second circuit means (39) for outputting a control signal of value kM derived from the difference signal and the input signal, where k is an integer which is a positive, negative or zero, and for selecting the value of k such that when the control signal is subtracted from the input signal at the transmit end (22) the value of the signal being outputted from the precoding circuit to the communication channel (21, 51, 61, 71) is minimised, and a third circuit means (40) for subtracting the control signal from the input signal upstream of the feedback and feedforward circuits (27, 31).

2. A precoding circuit as claimed in claim 1 characterised in that the feedforward signal from the feedforward circuit (31) is applied to the transmit end of the communication channel (21, 51, 61, 71) upstream of a node (30) from which the feedback circuit (27) derives its input from the transmit end of the communication channel (21, 51, 61, 71).

3. A precoding circuit as claimed in claim 1 characterised in that the feedforward circuit (31) is upstream of the feedback circuit (27), or alternatively, the feedforward circuit (31) is downstream of the feedback circuit (27), and a node (34) from which the feedforward circuit derives its input from the transmit end (22) of the communication channel (21, 51, 61, 71,), is downstream of the feedback circuit (27).

4. A precoding circuit as claimed in claim 1 characterised in that the first circuit means (35) comprises a first subtracting means (35) for subtracting the feedback signal from the feedforward signal and for outputting the difference signal, and preferably, a first adding means (37) is provided for adding the difference signal from the first circuit means (35) to the signal in the transmit end of the communication channel (21, 51, 61, 71), and advantageously, the value of k of the control signal is selected by the second circuit means (39) such that when the control signal is subtracted from the input signal the value of the signal at the output from the precoding circuit (20, 50, 60, 70), as it is fed to the communication channel (21, 51, 61, 71), is within the range +M/2 to −M/2.

5. A precoding circuit as claimed in claim 1 characterised in that the difference signal and the input signal are added to provide an intermediate signal, and the intermediate signal is fed to the second circuit means (39), and the control signal is derived by the second circuit means (39) from the intermediate signal, and preferably, a second adding means (38) is provided for adding the input signal and the difference signal from the first circuit means (35) for providing the intermediate signal, and preferably, the second circuit means (39) comprises a quantising circuit (39) for deriving the control signal from the intermediate signal.

6. A precoding circuit as claimed in claim 1 characterised in that the third circuit means (40) comprises a second subtracting means (40) for subtracting the control signal from the input signal, and preferably, the difference signal from the first circuit means (35) is applied to the transmit end of the communication channel (21, 51, 61, 71) intermediate respective nodes (30, 34) from which the feedback circuit (27) and the feedforward circuit (31) derive their respective inputs from the transmit end of the communication channel (21, 51, 61, 71).

7. A precoding circuit as claimed in claim 1 characterised in that the impulse response of the communication channel (21, 51, 61, 71) is finite, and preferably, the feedforward part of the transfer function of the communication channel (21, 51, 61, 71) can be broadly expressed in the Z-Domain by the equation:

$$H(z)=(1+a_1 \cdot z^{-1}+a_2 \cdot z^{-2}+a_3 \cdot z^{-3}+ \ldots +a_n \cdot z^{-n})$$

where a is a filter coefficient multiplier, and z is a time of n time-steps.

8. A precoding circuit as claimed in claim 1 characterised in that the impulse response of the communication circuit (21, 51, 61, 71) is infinite, and preferably, the feedback part of the transfer function of the communication channel (21, 51, 61, 71) can be broadly expressed in the Z-Domain by the equation:

$$H(z) = \frac{1}{(1+b_1 \cdot z^{-1} + b_2 \cdot z^{-2} + b_3 \cdot z^{-3} + \ldots + b_p \cdot z^{-p})}$$

where b is a filter coefficient multiplier, and z is a time of p time-steps.

9. A precoding circuit as claimed in claim 1 characterised in that the compound transfer function of the communication channel (21, 51, 61, 71) can be broadly expressed in the Z-Domain by the equation $$H(z) = \frac{(1+a_1 \cdot z^{-1} + a_2 \cdot z^{-2} + a_3 \cdot z^{-3} + \ldots + a_n \cdot z^{-n})}{(1+b_1 \cdot z^{-1} + b_2 \cdot z^{-2} + b_3 \cdot z^{-3} + \ldots + b_p \cdot z^{-p})}$$

where a and b are filter coefficient multipliers, and z is a time of n and p time-steps, and preferably, the transfer function of the feedback circuit (27) can be broadly expressed in the Z-Domain by the equation:

$$H(z) = \frac{1}{(1+a_1 \cdot z^{-1} + a_2 \cdot z^{-2} + a_3 \cdot z^{-3} + \ldots + a_n \cdot z^{-n})}$$

where a is a filter coefficient multiplier, and z is a time of n time-steps, and advantageously, the transfer function of the feedforward circuit (31) can be broadly expressed in the Z-Domain by the equation:

$$H(z)=(1+b_1 \cdot z^{-1}+b_2 \cdot z^{-2}+b_3 \cdot z^{-3}+ \ldots +b_p \cdot z^{-p})$$

where b is a filter coefficient multiplier, and z is a time of p time-steps.

10. A precoding circuit as claimed in claim 1 characterised in that the precoding circuit is adapted for use with a subset of communication channels where the feedforward part of the transfer function is minimum phase.

11. A precoding circuit as claimed in claim 1 characterised in that a gain circuit means (52) is provided at the transmit end of the communication channel (21, 51, 61, 71), downstream of the precoding circuit (20, 50, 60, 70) for compensating for a first coefficient of the feedforward part of the transfer function of the communication channel (21, 51, 61, 71), and preferably, the precoding circuit (20, 50, 60, 70) is for equalising a subset of communication channels where the first coefficient of the feedforward part of the transfer function is equal to one, and advantageously, a third adding means (41) is provided at the receive end (23) of the communication channel (21, 51, 61, 71) for adding a value kM to the signal at the receive end (23) of the communication channel (21, 51, 61, 71) for facilitating recovery of the input signal at the receive end (23), the value of kM corresponding to the value of kM subtracted from the input signal at the transmit end (22) of the communication channel (21, 51, 61, 71).

12. A precoding circuit as claimed in claim 1 characterised in that the precoding circuit is adapted for use with a non-linear constellation, and a first converting means (72) is provided for converting the signal at the transmit end of the communication channel (21, 51, 61, 71), from being linear to being non-linear, and preferably, the first converting means (72) is located after the third circuit means, and preferably, a second converting means (73) is provided at the receive end of the communication channel (21, 51, 61, 71) for converting the received signal at the receive end from non-linear to linear.

13. A communication circuit comprising the precoding circuit (20, 50, 60, 70) as claimed in claim 1.

14. A method for minimising distortion of a signal of range +M/2 to −M/2 being transmitted through a communication channel between a transmit end and a receive end of the communication channel, whereby the distortion is due to a transfer function of the communication channel, the method comprising the steps of:
feeding back the signal at the transmit end of the communication channel through a feedback circuit having a transfer function which is the inverse of a feedforward part of the transfer function of the communication channel,
feeding forward the signal at the transmit end of the communication channel through a feedforward circuit having a transfer function which is the inverse of a feedback part of the transfer function of the communication channel,
subtracting a feedback signal of the feedback circuit from a feedforward signal of the feedforward circuit to provide a difference signal,
deriving a control signal of value kM from the difference signal and an input signal, where k is an integer which is a positive, negative or zero, the value of k being selected such that when the control signal of value kM is subtracted from the input signal at the transmit end, the value of a signal being outputted from a precoding circuit to the communication channel is minimised, and
subtracting the control signal of value kM from the input signal upstream of the feedback and feedforward circuits.

15. A method as claimed in claim 14 characterised in that the feedforward signal from the feedforward circuit is applied to the transmit end of the communication channel upstream of a node from which the feedback circuit derives its input from the transmit end of the communication channel.

16. A method as claimed in claim 14 characterised in that the feedforward circuit is upstream of the feedback circuit.

17. A method as claimed in claim 14 characterised in that the feedback and feedforward signals are applied to the transmit end of the communication channel intermediate respective nodes from which the feedback circuit and the feedforward circuit derive their respective inputs at the transmit end of the communication channel, alternatively, the feedforward circuit is downstream of the feedback circuit, and a node from which the feedforward circuit derives input from the transmit end of the communication channel is downstream of the feedback circuit.

18. A method as claimed in claim 14 characterised in that the value of k of the control signal is selected such that when the control signal is subtracted from the input signal at the transmit end of the communication channel, the value of the signal being outputted from the precoding circuit to the communication channel at the transmit end thereof is within the range +M/2 to −M/2, and preferably, the difference signal and the input signal are added to provide an intermediate signal, and the control signal of value kM is derived from the intermediate signal.

19. A method as claimed in claim 14 characterised in that the impulse response of the communication channel is finite, and preferably, the feedforward part of the transfer function of the communication channel can be broadly expressed in the Z-Domain by the equation:

$$H(z) = (1 + a_1 \cdot z^{-1} + a_2 \cdot z^{-2} + a_3 \cdot z^{-3} + \ldots + a_n \cdot z^{-n})$$

where a is a filter coefficient multiplier, and z is a time of n time-steps.

20. A method as claimed in claim 14 the impulse response of the communication channel is infinite, and preferably, the feedback part of the transfer function of the communication channel can be broadly expressed in the Z-Domain by the equation:

$$H(z) = \frac{1}{(1 + b_1 \cdot z^{-1} + b_2 \cdot z^{-2} + b_3 \cdot z^{-3} + \ldots + b_p \cdot z^{-p})}$$

where b is a filter coefficient multiplier, and z is a time of a p time-steps, and preferably, the compound transfer function of the communication channel can be broadly expressed in the Z-Domain by the equation:

$$H(z) = \frac{(1 + a_1 \cdot z^{-1} + a_2 \cdot z^{-2} + a_3 \cdot z^{-3} + \ldots + a_n \cdot z^{-n})}{(1 + b_1 \cdot z^{-1} + b_2 \cdot z^{-2} + b_3 \cdot z^{-3} + \ldots + b_p \cdot z^{-p})}$$

where a and b are filter coefficient multipliers, and z is a time of n and p time-steps, and advantageously, the transfer function of the feedback circuit can be broadly expressed in the Z-Domain by the equation:

$$H(z) = \frac{1}{(1 + a_1 \cdot z^{-1} + a_2 \cdot z^{-2} + a_3 \cdot z^{-3} + \ldots + a_n \cdot z^{-n})}$$

where a is a filter coefficient multiplier, and z is a time of n time-steps, and preferably, the transfer function of the feedforward circuit can be broadly expressed in the Z-Domain by the equation:

$$H(z) = (1 + b_1 \cdot z^{-1} + b_2 \cdot z^{-2} + b_3 \cdot z^{-3} + \ldots + b_p \cdot z^{-p})$$

where b is a filter coefficient multiplier, and z is a time of p time-steps.

21. A method as claimed in claim 14 characterised in that the method is adapted for use with a subset of communication channels where the feedforward part of the transfer function is minimum phase, and preferably, the signal being fed to the communication channel at the transmit end thereof is multiplied by a gain factor for compensating for a first coefficient of the feedforward part of the transfer function of the communication channel, and advantageously, the method is for equalising a subset of communication channels where the first coefficient of the feedforward part of the transfer function is equal to one, and preferably, the method further comprises the step of adding a value of kM to a signal at the receive end of the communication channel for recovering the input signal at the receive end, the value of kM corresponding to the value of kM subtracted from the input signal at the transmit end of the communication channel.

* * * * *